(12) United States Patent
Jackson et al.

(10) Patent No.: US 6,913,297 B2
(45) Date of Patent: Jul. 5, 2005

(54) ROTARY LATCH MECHANISM

(75) Inventors: Frank T. Jackson, Lake Elsinore, CA (US); Timothy S. Rozema, Ladera Ranch, CA (US)

(73) Assignee: Hartwell Corporation, Placentia, CA (US)

(*) Notice: Subject to any disclaimer, the term of this patent is extended or adjusted under 35 U.S.C. 154(b) by 49 days.

(21) Appl. No.: 10/694,315

(22) Filed: Oct. 27, 2003

(65) Prior Publication Data

US 2005/0087996 A1    Apr. 28, 2005

(51) Int. Cl.[7] ............................................. E05C 3/06
(52) U.S. Cl. ..................... 292/196; 292/195; 292/197; 292/DIG. 31
(58) Field of Search ............................... 292/196–197, 292/200, 195, 97–98, DIG. 31, DIG. 60

(56) References Cited

U.S. PATENT DOCUMENTS

| | | | |
|---|---|---|---|
| 2,621,952 A * | 12/1952 | Gander | 292/196 |
| 2,927,812 A * | 3/1960 | Smith et al. | 292/196 |
| 4,155,575 A | 5/1979 | Poe | |
| 4,158,463 A | 6/1979 | Henrichs | |
| 4,159,137 A * | 6/1979 | Richter | 292/DIG. 60 |
| 4,209,194 A | 6/1980 | Poe | |
| 4,213,642 A | 7/1980 | Poe | |
| 4,264,092 A | 4/1981 | Bourne | |
| 4,265,474 A | 5/1981 | Poe | |
| 4,307,905 A | 12/1981 | Poe et al. | |
| 4,365,831 A | 12/1982 | Bourne | |
| 4,858,970 A * | 8/1989 | Tedesco et al. | 292/DIG. 31 |
| 4,925,221 A * | 5/1990 | Carmody et al. | 292/196 |
| 5,098,139 A * | 3/1992 | Larsson | 292/97 |
| 5,267,762 A * | 12/1993 | Gromotka | 292/DIG. 31 |
| 5,556,142 A | 9/1996 | Zankich | |
| 5,630,507 A * | 5/1997 | Baker | 292/97 |
| 5,638,709 A * | 6/1997 | Clavin | 292/DIG. 31 |
| 5,785,362 A * | 7/1998 | Nadherny | 292/197 |
| 6,039,362 A * | 3/2000 | Nadherny | 292/197 |
| 6,039,363 A * | 3/2000 | Sugimura et al. | 292/DIG. 31 |
| 6,059,231 A | 5/2000 | Dessenberger, Jr. | |
| 6,606,889 B1 * | 8/2003 | Tweedy | 292/DIG. 31 |

* cited by examiner

Primary Examiner—Daniel P. Stodola
Assistant Examiner—Christopher Boswell
(74) Attorney, Agent, or Firm—Barnes & Thornburg (57) ABSTRACT

A latch mechanism for releasably securing a first structure to a second structure. The latch mechanism includes a housing adapted to be attached to the first structure and an actuator pivotally attached to the housing. Selective pivotal movement of the actuator pivots a bolt member between a latched position and an unlatched position. The latch mechanism is sealed to prevent the flow of fluid through the latch mechanism.

39 Claims, 4 Drawing Sheets

ROTARY LATCH MECHANISM

BACKGROUND

The present disclosure relates to a rotary latch mechanism for releasably securing a first structure to a second structure, the latch mechanism includes an extendable and retractable handle that is adapted to be selectively pivoted between a latched position and an unlatched position to thereby move a bolt member between a latched position and an unlatched position, the latch mechanism being sealed to prevent the flow of fluid through the latch mechanism.

Latch mechanisms have been used to releasably secure a first aircraft structure, such as an aircraft panel or cowling, to a second aircraft structure. Latch mechanisms often extend through the panel with a handle located on the exterior of the panel for selectively latching a component of the latch mechanism that is located on the interior of the aircraft panel to the second aircraft structure. Latch mechanisms that extend through a panel may allow fluid, such as a liquid or gas, to flow through the latch mechanism between the exterior of the panel and the interior of the panel. Fluid, such as water, that flows inwardly through a latch mechanism into the interior of an aircraft may be undesirable. Fluid, such as pressurized air, flowing outwardly from an internal compartment of an aircraft through a latch mechanism may be undesirable. Space within an aircraft is also limited such that the latch mechanism is preferably made as small and compact as possible.

A sealed rotary latch mechanism for releasably securing a first structure to a second structure is disclosed. In at least one embodiment the latch mechanism is selectively moveable between a latched position and an unlatched position. The latch mechanism includes a housing adapted to be attached to a first structure, and an actuator; such as a cam, pivotally attached to the housing for pivotal movement about a first pivot axis between a latched first position and an unlatched second position. A seal member is located between the housing and the actuator creating a fluid-tight seal therebetween while allowing the actuator to pivot about the first pivot axis with respect to the housing. An extendable and retractable handle is attached to the actuator. The handle is adapted to facilitate pivotal movement of the actuator between its first and second positions. A follower is associated with the actuator and is linearly moveable between a third position and a fourth position by pivotal movement of the actuator. The actuator is adapted to move the follower to its third position when the actuator moves to its first position, and the actuator is adapted to move the follower to its fourth position when the actuator moves to its second position. A bolt member is pivotally attached to the housing for pivotal movement about a second pivot axis and is pivotally attached to the follower. The follower is adapted to pivot the bolt member about the second pivot axis to a latched fifth position when the follower moves to its third position, and the follower is adapted to pivot the bolt member to an unlatched sixth position when the follower moves to its fourth position.

DETAILED DESCRIPTION

Figure 1:
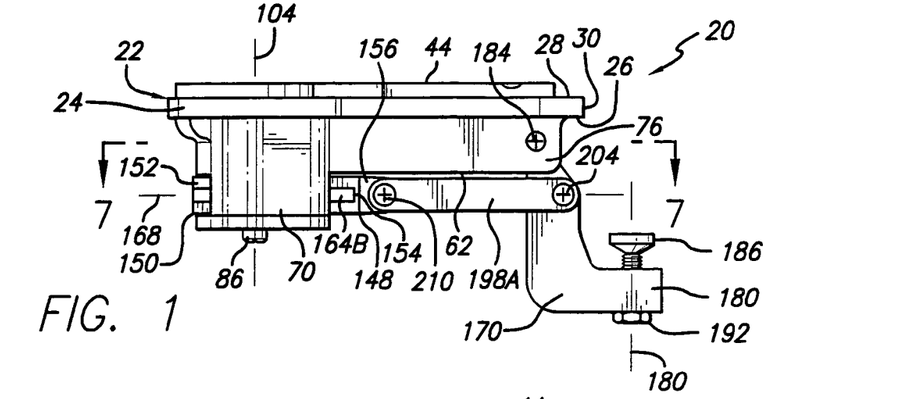
FIG. 1 is a side elevational view of a latch mechanism shown in the latched position.
Figure 2:
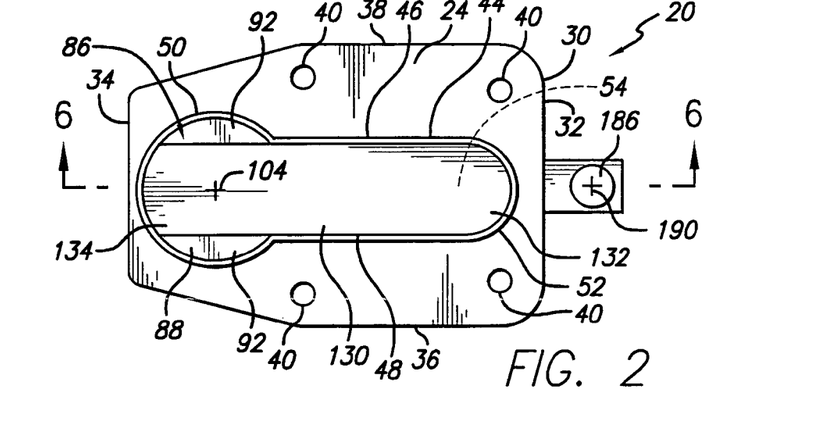
FIG. 2 is a top plan view of the latch mechanism in the latched position.
Figure 3:
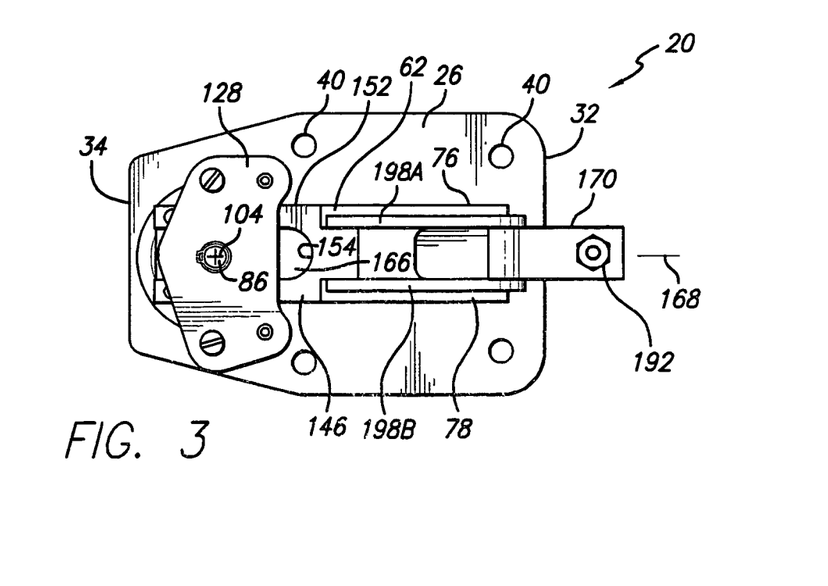
FIG. 3 is a bottom view of the latch mechanism in the latched position.
Figure 4:
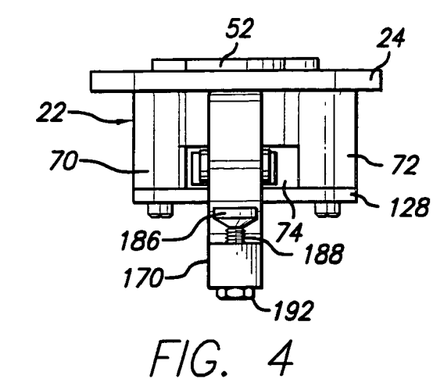
FIG. 4 is front elevational view of the latch mechanism in the latched position.
Figure 5:
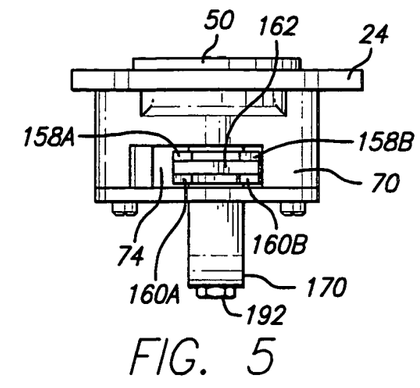
FIG. 5 is a rear elevational view of the late mechanism in the latched position.

A latch mechanism 20 is shown in FIGS. 1–7 in an extended or latched position. The latch mechanism 20 includes a housing 22. The housing 22 includes a mounting member 24, such as a generally planar flange or plate, having a generally planar internal surface 26 and a spaced apart and generally parallel planar external surface 28. The mounting member 24 includes a peripheral edge 30 that extends around the perimeter of the mounting member 24. As best shown in FIG. 2, the mounting member 24 extends longitudinally between a first end 32 and a second end 34, and extends transversely between a third end 36 and a fourth end 38. The mounting member 24 includes one or more apertures 40. The apertures 40 are adapted to receive fasteners, such as rivets, bolts or screws, to attach the housing 22 to a first structure, such as an aircraft structure. The internal surface 26 of the mounting member 24 is adapted to be placed adjacent the first structure. A seal member such as a resilient elastomeric gasket may be placed between the first structure and the internal surface 26 of the mounting member 24 to create a fluid-tight seal therebetween.

The housing 22 also includes a retaining wall 44 that extends upwardly from the external surface 28 of the mounting member 24. As shown in FIG. 2, one embodiment of the retaining wall 44 is illustrated in a generally key-hole shaped configuration. It will be appreciated that other configurations could be devised within the scope of the present disclosure. The retaining wall 44 includes a generally linear wall portion 46 and a spaced apart and generally parallel linear wall portion 48. The linear wall portions 46 and 48 extend between a generally curved wall portion 50 and generally curved wall portion 52. The curved wall portions 50 and 52 are curved in the form of a portion of an arc of a circle. The diameter of the curved wall portion 52 is approximately equal to the distance the linear wall portions 46 and 48 are spaced apart from one another. The diameter of the curved wall portion 50 is greater than the diameter of the curved wall portion 52. The retaining wall 44 forms a recess 54 between the linear wall portions 46 and 48 and adjacent the curved wall portion 52.

Figure 6:
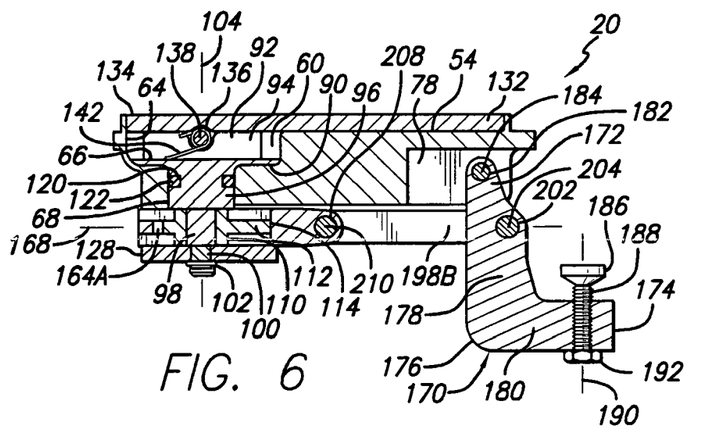
FIG. 6 is a partial cross sectional view taken along line 6—6 of FIG. 2.

The housing 22 includes a bore 60, as shown in FIG. 6, that extends from the external surface 28 of the mounting member 24 to a generally planar bottom surface 62 of the housing 22. The bore 60 forms a large diameter generally cylindrical wall 64 that extends from the external surface 28 of the mounting member 24 to a generally annular ledge 66. The bore 60 also includes a generally cylindrical wall 68, having a smaller diameter than the cylindrical wall 64, that extends from an inner edge of the annular ledge 66 to the bottom surface 62. The cylindrical wall 64 is located concentrically within the curved wall portion 50 of the retaining wall 44. The cylindrical wall 68 and the cylindrical wall 64 are located along a common central linear axis.

The housing 22 also includes a first post 70 and a second post 72 that extend downwardly from the bottom surface 62 at the second end 34 of the housing 22. The posts 70 and 72 are spaced apart from one another and are located on opposite sides of the longitudinal central axis of the housing 22. An open channel 74 is located between the posts 70 and 72. The housing 22 also includes a first lug 76 and a second lug 78 that extend downwardly from the internal surface 26 at the first end 32 of the housing 22. The lugs 76 and 78 are spaced apart from one another on opposite sides of the longitudinal central axis of the housing 22.

The latch mechanism 20 includes an actuator 86 pivotally attached to the housing 22. The upper end of the actuator 86 includes a receptacle 88 having a bottom wall 90 and two side walls 92 that are spaced apart in opposition to one another and that extend upwardly from the bottom wall 90. The top ends of the side walls 92 are located generally coplanar with the top edge of the retaining wall 44. The bottom wall 90 is in rotational engagement with the annular ledge 66 of the bore 60 in the housing 22. The outer surfaces of the side walls 92 are curved to conform to the cylindrical wall 64 of the bore 60 and are adapted to be located closely adjacent to the cylindrical wall 64. The internal surfaces of the side walls 92 are generally planar and vertical and are spaced apart and parallel to one another. An opening 94 is formed between the internal surfaces of the side walls 92.

A generally cylindrical first shaft 96 is attached to the bottom wall 90 and is located within the cylindrical wall 68 of the bore 60 in the housing 22. The shaft 96 includes a generally cylindrical surface that is located closely adjacent to the cylindrical wall 68. The actuator 86 includes a generally rectangular second shaft 98 that is concentrically attached to the bottom end of the first shaft 96 and that projects downwardly and outwardly beyond the bottom surface 62 of the housing 22. The second shaft 98 is generally rectangular in cross section. The bottom end of the shaft 98 is located generally coplanar with the ends of the posts 70 and 72 of the housing 22. A generally cylindrical third shaft 100 is concentrically attached to the bottom end of the second shaft 98 and extends outwardly therefrom. The central axes of the shafts 96, 98 and 100 are located generally coaxial with one another. The outer end of the third shaft 100 includes an annular groove adapted to removably receive a fastener 102, such as a snap ring. The actuator 86 is adapted to pivot or rotate within the bore 60 of the housing 22, with respect to the housing 22, about a central pivot axis 104. The actuator 86 is adapted to pivot about the axis 104 between a first latched position and a second unlatched position.

The actuator 86 includes a cam 108 attached to the second shaft 98 for conjoint rotation therewith about the pivot axis 104. The cam 108 includes a sleeve 110 including a generally rectangular bore through which the rectangular shaft 98 extends. The rectangular shaft 98 interlocks with the rectangular bore in the cam 108 such that the cam 108 is pivotally coupled to the shaft 98. The cam 108 is rotationally coupled to the shaft 98 for conjoint rotation or pivotal movement about the pivot axis 104, while the cam 108 may be removed from the shaft 98 when desired for maintenance or the like, by sliding the cam 108 along the pivot axis 104 and over the third shaft 100. The cam 108 includes a cam member 112 attached to the sleeve 110. The cam member 112 extends radially outwardly from the sleeve 110 generally perpendicular to the pivot axis 104. The cam member 112 may be a generally elliptical or circular disk having a central axis that is offset from the pivot axis 104. The cam member 112 includes a peripheral engagement edge 113. The outer end of the cam member 112, that is located the farthest from the pivot axis 104, includes an engagement tip 114 that forms a portion of the engagement edge 113.

As shown in FIG. 6, the cylindrical shaft 96 of the actuator 86 includes an annular groove 120. A seal member 122 is located within the groove 120 and is in engagement with the cylindrical wall 68 of the bore 60 in the housing 22. The seal member 122 is a gasket, such as an O-ring, and may be formed from a resilient elastomeric material. The seal member 122 creates a fluid-tight seal between the shaft 96 of the actuator 86 and the cylindrical wall 68 in the bore 60 of the housing 22, while permitting pivotal movement of the actuator 86 with respect to the housing 22 about the pivot axis 104. The seal member 122 thereby prevents fluid, such as water and/or air, from passing through the bore 60 in the housing 22. The seal member 122 may alternatively be located in an annular groove in the cylindrical wall 68 of the bore 60.

A retainer member 128, such as a plate, is attached to the ends of the posts 70 and 72 of the housing 22. The third shaft 100 of the actuator 86 extends through an aperture in the retainer member 128 and projects outwardly beyond the retainer member 128. As shown in FIG. 6, the fastener 102 is connected to the third shaft 100 of the actuator 86 on the exterior of the retainer member 128. The fastener 102 prevents movement of the actuator along the pivot axis 104 and thereby retains the actuator 86 within the bore 60 of the housing 22, while allowing the actuator 86 to pivot about the pivot axis 104 with respect to the housing 22. The actuator 86 may be removed from the bore 60 by removing the fastener 102 from the third shaft 100.

The latch mechanism 20 includes a handle 130 pivotally attached to the actuator 86. The handle 130 extends between a first end 132 and a second end 134. The handle 130 is generally plate-like and includes a generally planar bottom surface and a generally planar top surface. The second end 134 of the handle 130 is located in the opening 94 formed between the side walls 92 in the receptacle 88 of the actuator 86. A pivot shaft 136 pivotally attaches the handle 130 to the side walls 92 of the actuator 86 such that the handle 130 is selectively pivotal about a pivot axis 138 that extends centrally through the pivot shaft 136. The handle 130 is selectively pivotal about the pivot axis 138 between a horizontal retracted position as shown in FIG. 6, and an inclined extended position. A biasing member 142, such as a spring, is attached to the pivot shaft 136 and is adapted to bias the handle 130 from the extended position to the retracted position.

As shown in FIG. 6, when the handle 130 is in the retracted position, the handle 130 is located in the recess 54 and the top surface of the handle 130 is located generally coplanar with the top edge of the retaining wall 44. The handle 130 may be selectively pivoted to the extended position by pressing downwardly on the second end 134 of the handle 130. The second end 134 of the handle 130 thereby moves downwardly within the opening 94 between the side walls 92 of the actuator 86 such that the handle 130 is inclined upwardly at an inclined angle to horizontal. When the handle 130 is in the extended position, the first end 132 of the handle 130 may be manually grasped to thereby manually pivot the handle 130 and the actuator 86 about the pivot axis 104 between a first latched position and a second unlatched position. When the handle 130 is in the retracted position as shown in FIG. 6, the handle 130 is located within and closely adjacent to the retaining wall 44 such that the retaining wall 44 will prevent pivotal movement of the handle 130 and actuator 86 about the pivot axis 104. The handle 130 and actuator 86 are thereby locked in the latched position.

The latch mechanism 20 also includes a follower 146 having a first end 148 and a second end 150. The follower 146 includes a yoke 152. The yoke 152 includes an end wall 154 and a lug 156 attached to and extending transversely outwardly from the end wall 154. The yoke 152 includes elongate upper legs 158A and 158B that are spaced apart and generally parallel to one another. The upper legs 158A–B are attached at one end to the end wall 154 and extend outwardly generally perpendicular to the end wall 154. The yoke 152 also includes elongate lower legs 160A and 160B that are spaced apart and generally parallel to one another. The lower legs 160A–B are attached at one end to the end wall 154 and extend outwardly generally perpendicular to the end wall 154. Each of the legs 158A–B and 160A–B is generally linear and generally rectangular in cross section. The upper leg 158A is spaced apart above and generally parallel to the lower leg 160A. The upper leg 158A is spaced apart above and generally parallel to the lower leg 160B.

An abutment member 162, such as a rectangular bar, is attached to the outer ends of the legs 158A–B and 160A–B. The abutment member 162 extends from a first end that is located between the upper leg 158A and lower leg 160A, to a second end located between the upper leg 158B and lower leg 160B. The follower 146 includes a slot 164A located between the upper leg 158A and lower leg 160A that extends between the end wall 154 and the abutment member 162. The follower 146 also includes a slot 164B located between the upper leg 158B and lower leg 160B and that extends between the end wall 154 and the abutment member 162. The follower 146 also includes a recess 166 that extends from a first end at the end wall 154 to a second end at the abutment member 162. The recess 166 is located between the upper legs 158A–B and the lower legs 160A–B.

Figure 8:
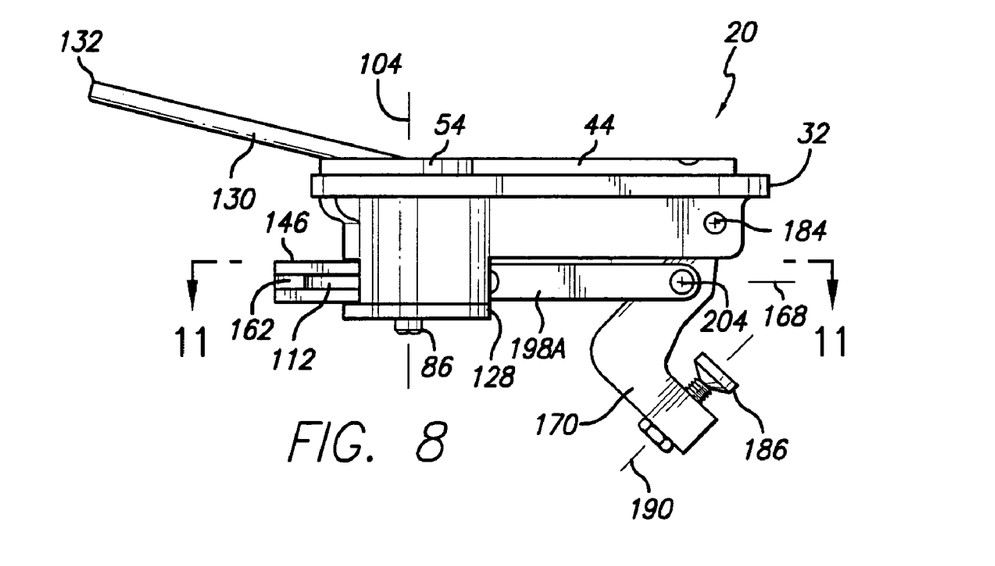
FIG. 8 is a side elevational view of the latch mechanism shown in the unlatched position.
Figure 9:
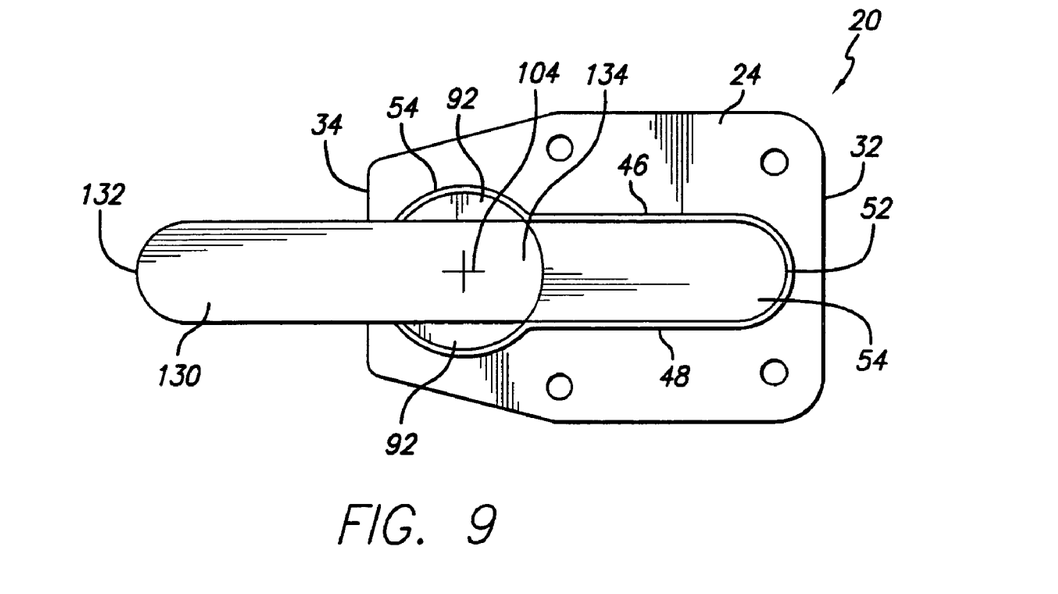
FIG. 9 is a top plan view of the latch mechanism in the unlatched position.
Figure 10:
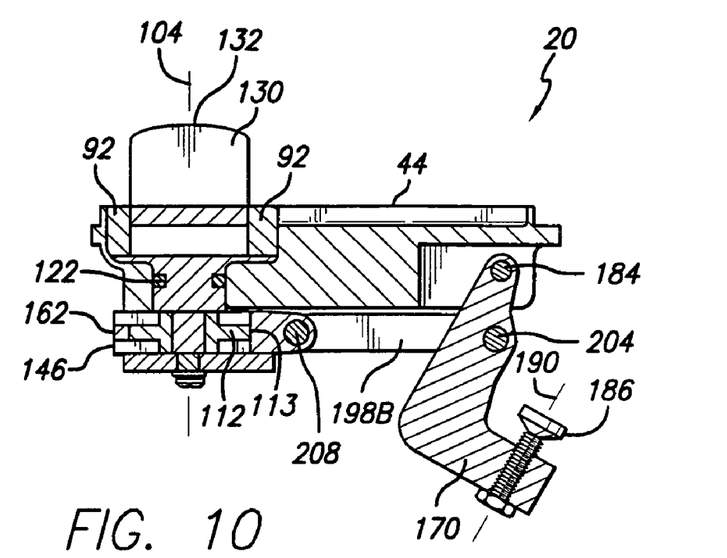
FIG. 10 is a partial cross sectional view of the latch mechanism similar to that as shown in FIG. 6 and in which the latch mechanism is shown in an intermediate position between the latched position and the unlatched position.
Figure 11:
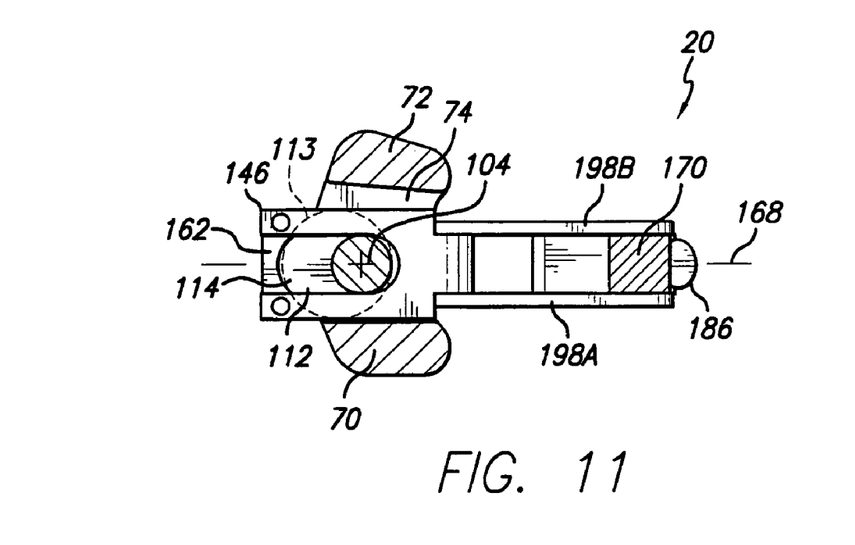
FIG. 11 is a cross sectional view taken along line 11—11 of FIG. 8.

The shaft 98 and the cam 108 of the actuator 86 are located within the recess 166 of the follower 146. The cam member 112 extends into the slots 164A–B on each side of the recess 166 in the latched and unlatched positions. When the actuator 86 is in the latched position as shown in FIG. 6, the engagement tip 114 of the cam 108 is adapted to engage the end wall 154 of the follower 146. As the actuator 86 is pivoted about the pivot axis 104 approximately one-half turn (180°) to the unlatched position as shown in FIG. 11, the engagement tip 114 rotates through the slot 164A between the legs 158A and 160A to the unlatched position as shown in FIG. 11, wherein the engagement tip 114 is adapted to engage the abutment member 162. The follower 146 is adapted to move along a linear translational axis 168 between its latched position as shown in FIG. 1 and its unlatched position as shown in FIG. 8 in response to pivotal movement of the actuator 86 about the pivot axis 104.

The latch mechanism 20 includes a bolt member 170 having a first end 172 and a second end 174. The bolt member 170 is generally L-shaped and includes an arm 176 having a first leg 178 and a second leg 180 that is disposed generally perpendicular to the first leg 178. The first leg 178, at the first end 172 of the bolt member 170, is pivotally attached to the first lug 76 and second lug 78 of the housing 22 by a pivot shaft 182 for pivotal movement of the bolt member 170 with respect to the housing 22 about a pivot axis 184 extending centrally through the pivot shaft 182. The second leg 180 of the arm 176, at the second end 174 of the bolt member 170, includes an engagement member 186. The engagement member 186 is adapted to engage a second structure when the bolt member 170 is in the latched position as shown in FIG. 1. The engagement member 186 is attached to the second leg 180 by a threaded shaft 188. The engagement member 186 is attached to the end of the threaded shaft 188 for pivotal and/or swiveling movement with respect to the shaft 188. The engagement member 186 is adapted to swivel about a linear axis 190 that extends through the shaft 188. A lock nut 192 is attached to an opposite end of the threaded shaft 188 and is adapted to selectively lock the threaded shaft 188 in position with respect to the arm 176. The position of the engagement member 186 with respect to the second leg 180 of the arm 176, and with respect to the internal surface 26 of the mounting member 24 of the housing 22, can be varied as desired by appropriate rotation of the threaded shaft 188 with respect to the arm 176.

Figure 7:
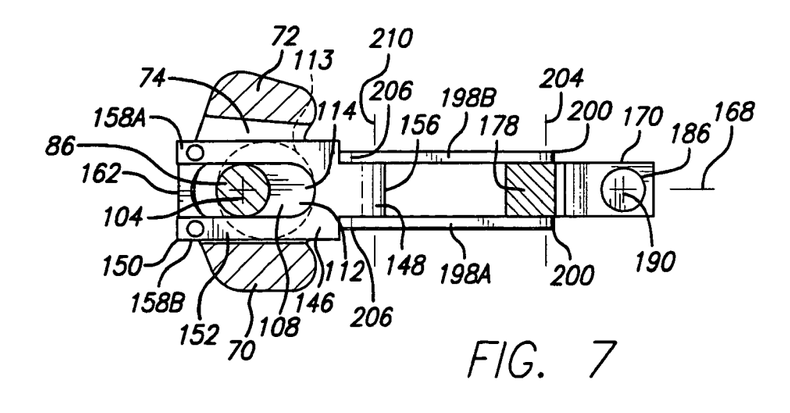
FIG. 7 is a cross sectional view taken along line 7—7 of FIG. 1.

The lug 156 of the follower 146 is pivotally connected to the arm 176 of the bolt member 170 by link members 198A and 198B. Each link member 198A–B includes a first end 200 pivotally attached to the first leg 178 of the bolt member 170 by a pivot shaft 202 having a central pivot axis 204. Each link member 198A–B also includes a second end 206 pivotally connected to the lug 156 of the follower 146 by a pivot shaft 208 having a central pivot axis 210. As best shown in FIG. 7, the link members 198A and B are located on respective sides of the lug 156 and first leg 178 of the bolt member 170 and are generally parallel to one another. The pivot axes 184, 204 and 210 are all generally parallel to one another, and are all generally transverse with respect to the pivot axis 104, translational axis 168, and central axis 190.

When the latch mechanism 20 is in the latched position as shown in FIG. 1, the central axis 190 of the shaft 188 is generally parallel to the pivot axis 104 and is generally perpendicular to the translational axis 168 of the follower 146. In addition, the pivot axes 204 and 210 are generally located in the same plane with the translational axis 168 of the follower 146 and the cam member 112. The pivot axis 184 is located vertically between the translational axis 168 and the mounting member 24 of the housing 22, and is located horizontally between the pivot axes 204 and 210. The pivot axes 184, 204 and 210 form the vertices of a triangle wherein the vertex angle at the pivot axis 202 is an acute angle.

When the latch mechanism 20 is in the latched position, the bolt member 170 is prevented from pivoting about the pivot axis 184 from the latched position, as shown in FIG. 1, to the unlatched position, as shown in FIG. 8, by the engagement of the engagement tip 114 of the cam 108 against the end wall 154 of the follower 146, which thereby prevents translational movement of the follower 146 along the axis 168 from its latched position as shown in FIG. 1 toward its unlatched position as shown in FIG. 8. The force with which the follower 146 engages the cam 108 of the actuator 186 in resisting pivotal movement of the bolt member 170 from the latched position to the unlatched position is resisted by the actuator 86. This resisting force does not apply a rotational force to the cam 108 that attempts to pivot the actuator 86 about the pivot axis 104, which would allow translational movement of the follower 146 from the latched position toward the unlatched position. However, even if this resisting force were to apply such a rotational force to the actuator 86, rotation of the actuator 86 about the pivot axis 104 would be resisted by the engagement of the handle 130 against the retaining wall 44, when the handle 130 is in the retracted position.

When it is desired to move the latch mechanism 20 from the latched position, as shown in FIG. 1, to the unlatched position as shown in FIG. 8, the second end 134 of the handle 130 is manually pressed downwardly into the opening 94 between the side walls 92 of the actuator 86, such that the handle 130 pivots about the pivot axis 138 from the retracted position to the extended position where the handle 130 is disposed at an inclined angle with respect to the external surface 28 of the mounting member 24. The first end 132 of the handle 130 thereby pivots upwardly such that the first end 132 is no longer located within the recess 54 formed by the retaining wall 44.

While in the extended position, the handle 130 may be manually rotated from the extended and latched position one-half turn about the pivot axis 104 to the unlatched position as shown in FIG. 8. As the handle 130 pivots from its latched position to its unlatched position, the handle 130 conjointly pivots the actuator 86 about the pivot axis 104. As the actuator 86 pivots from its latched position to its unlatched position, the engagement tip 114 of the cam member 112 pivots about the pivot axis 104 from its latched position adjacent to the end wall 156 of the follower 146, through the slot 164A, to its unlatched position wherein the engagement tip 114 is located adjacent the abutment member 162 of the follower 146. As the cam member 112 pivots from its latched position to its unlatched position, the cam member 112 pivots through the slot 164A between the upper leg 158A and lower leg 160A of the follower 146 and the engagement edge 113 of the cam member 112 engages the abutment member 162. As the cam member 112 continues to pivot about the pivot axis 104, the cam member 112 moves the follower 146 from its latched position toward its unlatched position along the linear translational axis 168. When the cam member 112 is fully pivoted to its unlatched position, the engagement tip 114 is in engagement with the abutment member 162 and the cam member 112 will have moved the follower 146 to its unlatched position.

As the follower 146 moves along the translational axis 168 from its latched position to its unlatched position, the follower 146 and link members 198A–B pivot the bolt member 170 about the pivot axis 184 from its latched position, as shown in FIG. 1, to its unlatched position as shown in FIG. 8. As the bolt member 170 pivots about the pivot axis 184 from its latched position to its unlatched position, the pivot shaft 202 and pivot axis 204 move in a generally circular arc. When the bolt member 170 is in its unlatched position as shown in FIG. 8, the pivot axes 204 and 208 are generally parallel to one another and are generally coplanar with the translational axis 168. As shown in FIG. 8, when the bolt member 170 is in its unlatched position, the pivot axes 184, 204, and 210 form the vertices of a triangle, wherein the vertex angle at the pivot axis 204 is an obtuse angle.

As shown in FIGS. 1 and 6, when the bolt member 170 is in the latched position, the second leg 180 of the arm 176 and the engagement member 186 are located horizontally outwardly beyond the first end 32 of the housing 22, such that the engagement member 186 is adapted to engage the second structure and thereby latch the latch mechanism 20 and the first structure to the second structure. As shown in FIG. 8, when the bolt member 170 is in the unlatched position, the entire bolt member 170, including the second leg 180 and engagement member 186, does not project horizontally outwardly beyond the first end 32 of the housing 22. The bolt member 170 will therefore not interfere with removal of the latch mechanism 20 and the attached first structure from the second structure.

The latch mechanism 20 is moved from the unlatched position, as shown in FIG. 8, to the latched position, as shown in FIG. 1, in substantially the reverse manner from that described above by manually rotating the handle 120 from the unlatched position as shown in FIG. 8 one-half turn about the pivot axis 104 to the latched position. The handle 130 may then be pivoted about the pivot axis 138 to locate the first end 132 of the handle 130 in the recess 54 within the retaining wall 44. The latch mechanism 20 is thereby adapted to releasably secure a first structure, to which the latch mechanism 20 is attached, to a second structure.

Various features of the invention have been particularly shown and described in connection with the illustrated embodiment of the invention, however, it must be understood that these particular arrangements merely illustrate, and that the invention is to be given its fullest interpretation within the terms of the appended claims.

What is claimed is:

1. A latch mechanism for releasably securing a first structure to a second structure, said latch mechanism comprising:
    a housing adapted to be attached to the first structure;
    an actuator pivotally attached to said housing for pivotal movement about a first pivot axis, said actuator being selectively pivotal about said first pivot axis between a first position and a second position;
    a handle attached to said actuator, said handle adapted to facilitate pivotal movement of said actuator between said first and second positions;
    a follower associated with said actuator, said follower being movable between a third position and a fourth position by said actuator along a translation axis, the translational axis being generally perpendicular to the first pivot axis, said actuator adapted to move said follower to said third position when said actuator moves to said first position, said actuator adapted to move said follower to said fourth position when said actuator moves to said second position; and
    a bolt member having a first end and a second end, said first end of said bolt member being pivotally attached to said housing for pivotal movement about a second pivot axis between a fifth position and a sixth position, said follower being connected to said bolt member, said follower adapted to pivot said bolt member to said fifth position when said follower moves to said third position and to pivot said bolt member to said sixth position when said follower moves to said fourth position, said second end of said bolt member adapted to engage the second structure when said bolt member is in said fifth position such that said latch assembly is adapted to secure the first structure to the second structure, said second end of said bolt member is adapted to be disengaged from the second structure when said bolt member is in said sixth position.

2. The latch mechanism of claim 1 wherein said housing includes bore and said actuator extends through said bore.

3. The latch mechanism of claim 1 including a seal member located between said housing and said actuator, said seal member creating a seal between said actuator and said housing while allowing said actuator to pivot about said first pivot axis with respect to said housing.

4. The latch mechanism of claim 3 wherein said seal member comprises a gasket formed from an elastomeric material.

5. The latch mechanism of claim 1 wherein said actuator includes a cam, said cam adapted to move said follower to said third position when said actuator is moved to said first position and adapted to move said follower to said fourth position when said actuator is moved to said second position.

6. The latch mechanism of claim 5 wherein said actuator includes a first end and a second end, said cam attached to said second end of said actuator, said first end of said actuator including a side wall, said handle being attached to said side wall.

7. The latch mechanism of claim 5 wherein said follower includes a recess having a first end and a second end, said cam being located in said first end of said recess when said actuator is in said first position, said cam being located in said second end of said recess when said actuator is in said second position.

8. The latch mechanism of claim 7 wherein said follower includes a slot in communication with said recess, said cam member rotating within said slot as said cam member pivots between said first position and said second position.

9. The latch mechanism of claim 1 wherein said handle is pivotally attached to said actuator such that said handle is selectively pivotal about a third pivot axis between a retracted position and an extended position, said handle adapted to facilitate pivotal movement of said actuator member about said first pivot axis when said handle is in said extended position.

10. The latch mechanism of claim 9 wherein said handle is adapted to conjointly pivot with said actuator about said first pivot axis when said handle is in said extended position.

11. The latch mechanism of claim 9 wherein said housing includes a recess adapted to receive at least a portion of said handle when said handle is in said retracted position such that said housing prevents pivotal movement of said handle and said actuator about said first pivot axis when said handle is in said recess of said housing.

12. The latch mechanism of claim 9 including a biasing member resiliently biasing said handle from said extended position toward said retracted position.

13. The latch mechanism of claim 1 wherein said actuator includes a shaft and a cam attached to said shaft, said cam adapted to move said follower between said third position and said fourth position when said actuator is pivoted between said first position and said second position.

14. The latch mechanism of claim 13 including a retainer member attached to said housing, said actuator being pivotally attached to said retainer member.

15. The latch mechanism of claim 13 wherein said shaft includes an annular groove adapted to receive a seal member.

16. The latch mechanism of claim 13 wherein said cam includes a cam member projecting outwardly from said shaft generally perpendicular to said first pivot axis.

17. The latch mechanism of claim 16 wherein said cam member includes a central axis, said central axis being generally parallel to and offset from said first pivot axis.

18. The latch mechanism of claim 16 wherein said cam member includes an aperture through which said shaft extends, said aperture adapted to rotationally couple said cam member to said shaft for conjoint rotation about said first pivot axis.

19. The latch mechanism of claim 18 wherein said aperture in said cam member is noncircular.

20. The latch mechanism of claim 18 including a collar attached to said cam member, said aperture extending through said collar and said cam member.

21. The latch mechanism of claim 16 wherein said cam member includes a peripheral engagement edge adapted to engage said follower.

22. The latch mechanism of claim 21 wherein said peripheral engagement edge of said cam member is curved.

23. The latch mechanism of claim 1 wherein said follower includes a yoke, said yoke including an end wall and a plurality of legs extending outwardly from said end wall, said legs forming a recess adapted to receive said actuator.

24. The latch mechanism of claim 23 wherein said follower includes an abutment member attached to said legs of said yoke, said recess being located between said end wall and said abutment member.

25. The latch mechanism of claim 1 including a link member having a first end and a second end, said first end of said link member being attached to said follower, said second end of said link member being attached to said bolt member.

26. The latch mechanism of claim 25 wherein said second end of said link member is pivotally attached to said bolt member such that said bolt member is pivotal with respect to said link member about a fourth pivot axis, said fourth pivot axis and said translational axis of said follower being generally located in the same plane when said bolt member is in said fifth position.

27. The latch mechanism of claim 1 wherein said bolt member includes an arm having a first leg and a second leg disposed at an angle to said first leg, said first leg being attached to said housing and to said follower.

28. The latch mechanism of claim 1 wherein said bolt member includes an arm having a first end and a second end, and an engagement member attached to said second end of said arm, said engagement member adapted to engage the second structure.

29. The latch mechanism of claim 28 wherein said engagement member is selectively positionable with respect to said second end of said arm along a generally linear axis.

30. The latch mechanism of claim 29 wherein said bolt member includes a shaft threadably attached to said second end of said arm member, said engagement member being attached to an end of said shaft.

31. The latch mechanism of claim 1 wherein said second end of said bolt member extends outwardly beyond said housing when said bolt member is in said fifth position, and said second end of said bolt member does not extend outwardly beyond said housing when said bolt member is in said sixth position.

32. A latch mechanism for releasably securing a first structure to a second structure, said latch mechanism comprising:
   a housing adapted to be attached to the first structure;
   a cam pivotally attached to said housing, said cam adapted to pivot about a first pivot axis between a first position and a second position;
   a follower coupled to said housing, said cam adapted to move said follower along a generally linear translational axis between a third position and a fourth position when said cam is pivoted between said first position and said second position, said translational axis being generally perpendicular to said first pivot axis; and
   a bolt member having a first end and a second end, said first end of said bolt member being pivotally attached to said housing for pivotal movement about a second pivot axis between a fifth position and a sixth position, said follower being attached to said bolt member such that said follower is adapted to pivot said bolt member to said fifth position when said follower moves to said fourth position and said follower is adapted to pivot said bolt member to said sixth position when said follower moves to said fourth position, said second end of said bolt member adapted to engage the second structure when said bolt member is in said fifth position.

33. The latch mechanism of claim 32 including a link member having a first end pivotally attached to said follower for pivotal movement about a third pivot axis and a second end pivotally attached to said bolt member for pivotal movement about a fourth pivot axis.

34. The latch mechanism of claim 33 wherein said fourth pivot axis and said translational axis of said follower are generally located in the same plane when said bolt member is in said fifth position.

35. The latch mechanism of clam 34 wherein said third pivot axis and said translational axis of said follower are generally located in the same plane.

36. A method for releasably securing a first structure to a second structure, said method comprising the steps of:
providing a latch mechanism having a housing, an actuator pivotally attached to the housing, a handle pivotally attached to said actuator, and a bolt member pivotally attached to said housing, said bolt member being coupled to said actuator member;
attaching said housing to the first structure;
pivoting said actuator from a first position to a second position about a first axis;
pivoting said bolt member from an unlatched position to a latched position by said pivotal movement of said actuator from said first position to said second position about a second axis, generally perpendicular to said first axis;
engaging the second structure with said bolt member when said bolt member is in said latched position; and
pivoting the handle with respect to the actuator from an extended position to a retracted position after pivoting the actuator from said first position to said second position.

37. The method of claim 36 including the step of pivoting said actuator from said second position to said first position such that said actuator pivots said bolt member from said latched position to said unlatched position wherein said bolt member is released from the second member.

38. The method of claim 36 including the step of preventing pivotal movement of said actuator when said handle is in said retracted position.

39. The method of claim 36 including the step of forming a seal between said actuator and said housing.

* * * * *